United States Patent Office 3,036,987
Patented May 29, 1962

3,036,987
BLENDS OF CRYSTALLIZABLE POLYPROPYLENE HAVING ISOTACTIC STRUCTURE WITH AN AMORPHOUS COPOLYMER OF ETHYLENE AND PROPYLENE AND METHOD FOR MAKING SAME
Franco Ranalli, Milan, Italy, assignor to Montecatini Societa Generale per l'Industria Mineraria e Chimica
No Drawing. Filed July 9, 1958, Ser. No. 747,367
Claims priority, application Italy July 16, 1957
4 Claims. (Cl. 260—45.5)

This invention relates to thermoplastic compositions comprising linear, regular head-to-tail highly isotactic highly crystalline polypropylene and which have a lower brittle point than is normally possessed by the polypropylene.

Recently, G. Natta and his co-workers disclosed new polymers of alpha-olefins of the formula $CH_2=CHR$ where R is a hydrocarbon radical containing from 1 to 16 carbon atoms and which consist substantially of macromolecules having the regular steric structure which Natta has termed the "isotactic" structure.

The isotactic structure is the structure of the portions of a macromolecule of an alpha-olefin polymer in which, when the macromolecule is arbitrarily assumed to be fully extended in a plane, the R substituents on the tertiary carbon atoms of adjacent monomeric units making up the given section of the macromolecular main chain are all on one side (e.g. above) and the H atoms bound to said tertiary carbon atoms are all on the other side (e.g. below) of the plane of the chain. In a successive isotactic portion of the same chain the position of the R and H substituents may be reversed with respect to the positions they occupy in the previous portion.

Isotactic macromolecules are linear, regular head-to-tail macromolecules having substantially the isotactic structure.

Isotactic polymers are homopolymers substantially consisting of isotactic macromolecules as defined.

Natta et al. have shown how to obtain the isotactic polymers by polymerizing the alpha-olefin in an inert hydrocarbon solvent with catalysts prepared from compounds of heavy metals of the first subgroup of groups IV to VI of the Periodic Table (Mendeléeff) and organometallic compounds of metals of groups II to III of that Periodic Table. They have also shown that depending on the specific catalyst used in the polymerization, the crude polymerizate may be a mixture of isotactic and atactic polymers, with a prevalence of the atactic structure, which can be separated by means of selective solvents, or the crude polymerizate may be prevailingly (over 50%) to substantially isotactic. Thus, when the catalyst is prepared from a high valency halide of a transition metal, such as $TiCl_4$, and e.g. triethyl aluminum, and is substantially non-crystalline and soluble to finely dispersible in the hydrocarbon solvent, the crude polymerizate is generally substantially amorphous but contains some isotactic polymers which can be separated by means of selective solvents from the crude product. On the other hand, Natta et al. have also shown that when the catalyst is prepared from a low valency transition metal halide such as $TiCl_3$ and, e.g. triethyl aluminum, and is substantially solid, crystalline and hydrocarbon-insoluble, the crude polymerizate consists prevailingly to substantially of isotactic macromolecules and is prevailingly to substantially crystalline under normal conditions.

The isotactic macromolecules may be separated from the crude propylene polymerizate in which they are mixed with linear, regular head-to-tail atactic polypropylene by extracting the crude polymerizate with n-heptane. The residue of the n-heptane extraction comprises the isotactic macromolecules.

Natta et al. have shown that the isotactic polymeric alpha-olefins, and particularly isotactic polypropylene have exceptionally good physical properties, including high tensile strength, high elastic modulus, good resistance to high temperatures, etc. However, the brittle point of high molecular weight isotactic polypropylene is comparatively high, being between 0° C. and 20° C., depending on the average molecular weight of the polymer. This relatively high brittle point complicates processing of the polymer and limits its usefulness for purposes which require resistance to low temperatures.

It has been attempted to lower the brittle point of isotactic polypropylene by blending it with other polymers having, inherently, a very low brittle point. However, the blends have not been entirely satisfactory.

For instance, polyethylene has the very low brittle point of $-72°$ C. but in order to obtain a blend of isotactic polypropylene and polyethylene having a brittle point of $-15°$ C. to $-20°$ C., it is necessary to use the polyethylene in an amount of 70% or higher on the weight of the blend.

Such large amounts of the polyethylene inevitably completely alter the characteristics of the blend so that it does not exhibit the properties of the isotactic polypropylene component.

The primary object of this invention is to provide new thermoplastic compositions comprising prevailingly to substantially isotactic polypropylene which have all of the desirable physical properties of the polypropylene but have, in addition, a good impact strength at low temperatures.

This and other objects of the invention are accomplished by blending the prevailingly to substantially isotactic polypropylene with a linear, regular head-to-tail, substantially amorphous copolymer of propylene and ethylene containing in the macromolecule from 30% to 70% by weight, preferably 50% by weight, of ethylene.

As shown by Natta et al., the linear regular head-to-tail substantially amorphous copolymers can be obtained by copolymerizing ethylene and propylene with catalysts of the type aforesaid.

Surprisingly, blends according to the invention and containing the ethylene-propylene copolymer have essentially the same mechanical and thermal characteristics as the isotactic polypropylene, coupled with a low brittle point of 0° C. or below.

The blends of the invention are prepared by mixing the isotactic polypropylene and the ethylene-propylene copolymer together in any convenient mixing device at a temperature above the melting point for the polypropylene, i.e. at a temperature of about (or above) 180° C. until a homogeneous mass is obtained.

By molding the blends thus prepared, shaped objects having good impact strength down to temperatures below 0° C. are obtained.

The proportion of the ethylene-propylene copolymer blended with the polypropylene can be varied over a relatively wide range, depending on the use for which the blend is intended and the characteristics desired. In general, amounts of the copolymer between 5% and 20% on the weight of the blend are sufficient to lower the brittle point of the polyproplyene to satisfactory values without any appreciable change in other properties of the polypropylene.

The following example, which is not intended as limiting, illustrates the results and advantages of the invention,

EXAMPLE

To 900 g. of polypropylene having a molecular weight of from 120,000 to 150,000, and which is 82% non-extractable with boiling n-heptane there are added 2 g. of "Santo-White" [4,4-thio-bis(6 tert. butyl-meta-cresol); The Condensed Chemical Dictionary, fifth ed., published by Reinhold Publishing Corp., N.Y., 1956, p. 966], crystals as stabilizer for the polymer and 100 g. of a substantially amorphous ethylene-propylene copolymer containing in the macromolecule about 50% by weight of ethylene and 50% by weight of propylene.

The mixture is calendered for 20 minutes at 180 to 190° C. in a roll mixer. The sheet thus obtained is molded in a plate press at 200° C. for 5 minutes. Specimens are then cut from the molded sheet and tested for determination of the brittle point.

Sheets of the polypropylene (not modified by incorporation of the copolymer) are molded in the same manner and specimens are cut therefrom for comparison with the modified polypropylene.

The specimens are tested according to the standard ASTM methods. The results obtained are shown in the table below.

Table

|  | ASTM | Polypropylene (alone) | Polypropylene plus 10% ethylene-propylene copolymer |
|---|---|---|---|
| Brittle point, °C | D 746-52T | +6 | −7. |
| Vicat (5 kg.), °C |  | 79±2 | 68±2. |
| Yield strength, kg./cm.² | D 412-52 | 323±2 | 259±2. |
| Flexural modulus E, kg./cm.² | D 747-50 | 9,700±900 | 8,100±600. |
| Rockwell R hardness | D 785-51 | 91.3±1.6 | 78±1. |
| Shore D hardness |  | 70 | 65. |

By "prevailingly to substantially isotactic polypropylene" is meant, for the present purposes, a polypropylene comprising at least 55% of isotactic macromolecules as defined herein.

By "high molecular weight" polypropylene is meant a polymer having a molecular weight of at least 30,000.

The blends of the invention can be made into shaped objects and manufactured articles of all kinds by standard techniques, including compression and injection molding, and have the decided advantage of excellent impact strength at low temperatures, along with the good physical properties and chemical and heat-resistance which are inherent characteristics of the isotactic polypropylene.

Since some changes and variations may be made in details in practicing the invention, without departing from the spirit thereof, it is intended to include in the scope of the appended claims all such modifications as may be apparent to those skilled in this art.

What is claimed is:

1. A blend consisting essentially of (1) polypropylene made up for at least 55% of crystallizable isotactic macromolecules with (2) from 5% to 20% on the weight of the blend of a linear, amorphous copolymer of ethylene and propylene containing from 30% to 70% of ethylene by weight in the copolymer macromolecule, the blend having a brittle point which is substantially lower than the brittle point of the polypropylene component of the blend.

2. A blend consisting essentially of (1) polypropylene made up for at least 55% of crystallizable isotactic macromolecules with (2) from 5% to 20% on the weight of the blend of a linear, amorphous copolymer of ethylene and propylene containing about 50% of ethylene by weight in the copolymer macromolecule, the blend having a brittle point which is substantially lower than the brittle point of the polypropylene component of the blend.

3. Manufactured shaped objects of a blend consisting essentially of (1) polypropylene made up for at least 50% of crystallizable isotactic macromolecules with (2) from 5% to 20% on the weight of the blend of a linear, amorphous copolymer of ethylene and propylene containing from 30% to 70% of ethylene by weight in the copolymer macromolecule, said blend having a brittle point substantially lower than the brittle point of the propylene component of the blend.

4. The method for lowering the normal brittle point of polypropylene made up for at least 55% of crystallizable isotactic macromolecules and normally having a high brittle point, which method comprises intimately mixing the polypropylene with from about 5% to about 20% on the weight of the mixture of a linear, essentially amorphous copolymer of ethylene and propylene containing in the copolymer macromolecule from 30% to 70% of ethylene by weight, and heating the mixture at a temperature between 180° C. and 190° C. to obtain a homogeneous blend the brittle point of which blend is substantially lower than the normal brittle point of the polypropylene.

References Cited in the file of this patent

UNITED STATES PATENTS 2,692,258     Roebuck     Oct. 19, 1954

OTHER REFERENCES

Natta: J. Am. Chem. Soc., 77, page 1708 (1955).

UNITED STATES PATENT OFFICE
CERTIFICATE OF CORRECTION

Patent No. 3,036,987                                  May 29, 1962

Franco Ranalli

It is hereby certified that error appears in the above numbered patent requiring correction and that the said Letters Patent should read as corrected below.

Column 4, line 25, for "50%" read -- 55% --.

Signed and sealed this 2nd day of October 1962.

(SEAL)
Attest:

ERNEST W. SWIDER
Attesting Officer

DAVID L. LADD
Commissioner of Patents